May 1, 1934.     G. M. DEMING     1,956,824
CIRCUMFERENTIAL PIPE WELDING
Filed July 7, 1930     2 Sheets-Sheet 1
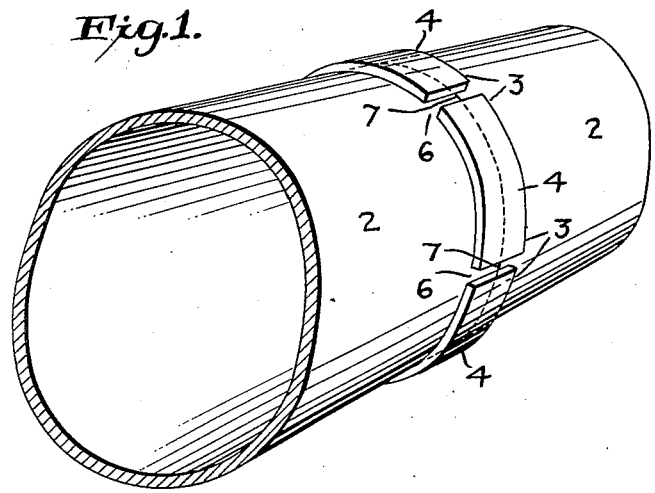
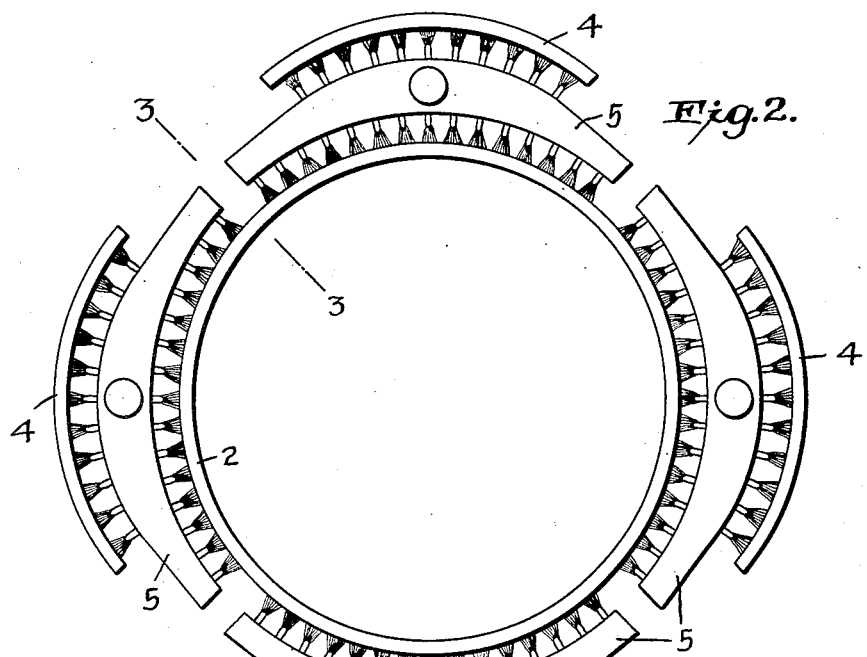
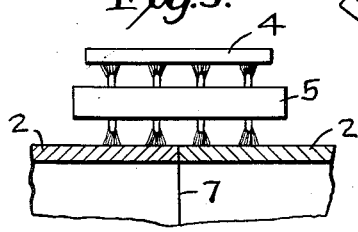
INVENTOR
George M. Deming
BY
ATTORNEY May 1, 1934.　　　　G. M. DEMING　　　　1,956,824
CIRCUMFERENTIAL PIPE WELDING
Filed July 7, 1930　　　2 Sheets-Sheet 2
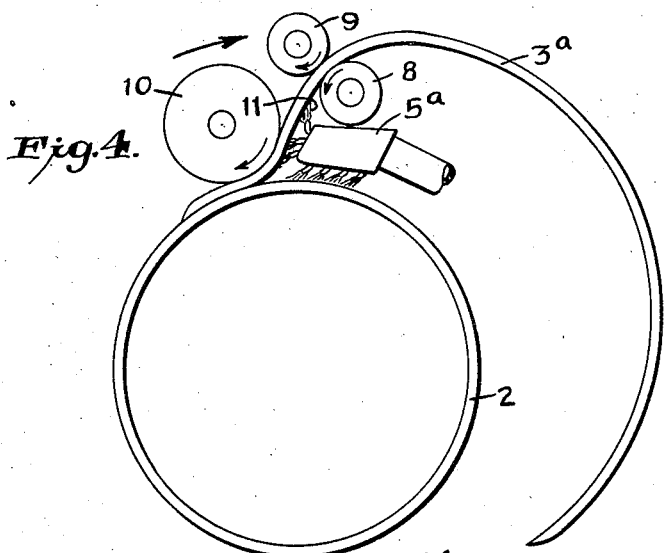
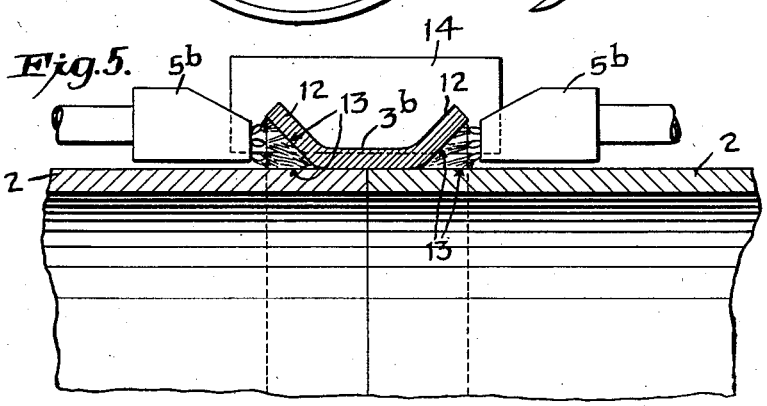
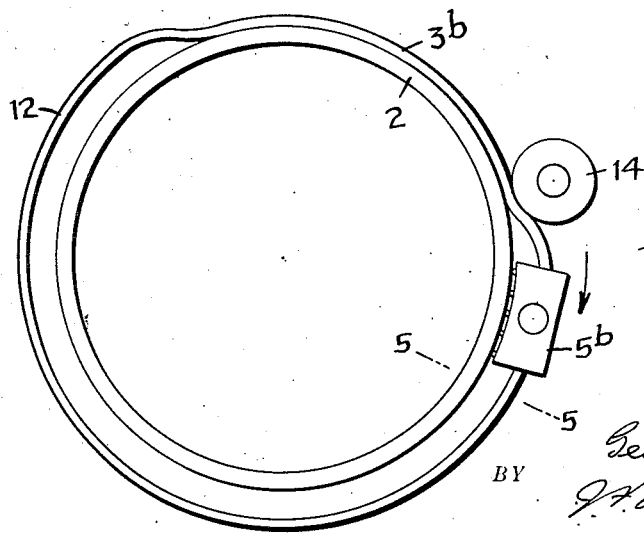
INVENTOR
George M. Deming
BY
ATTORNEY Patented May 1, 1934

1,956,824

UNITED STATES PATENT OFFICE 1,956,824

CIRCUMFERENTIAL PIPE WELDING

George M. Deming, East Orange, N. J., assignor to Air Reduction Company, Incorporated, New York, N. Y., a corporation of New York Application July 7, 1930, Serial No. 466,029

7 Claims. (Cl. 113—112)

REISSUED

This invention relates to a method of uniting plate metal parts, and more particularly to a method of uniting the ends of pipe sections, more particularly large diameter pipe in the construction of welded pipe lines.

The object is to provide a quick and economical method for joining up the plate metal parts, or the pipe sections, and for producing very strong joints between them. A further object is to obviate preparation of the ends of the pipe by the beveling necessary for fusion butt welding.

The method is generally characterized as one in which a lap band is employed and in which the inner surface of this band and the outer surfaces of the adjoining portions of two plate metal parts, or two pipe sections, are simultaneously brought to a state of surface fusion by quick oxyacetylene flame heating, the fused surface of the band being immediately pressed or applied against the fused surfaces of the parts or pipe sections, so as to produce surface fusion welds between the band and the parts or pipe sections at both sides of the crevice between the abutting ends. The reducing envelope gases of the oxyacetylene flame blanket the surfaces of the metal and prevent the formation of oxide.

By "surface fusion" in this specification is meant that state in which the surface of the metal is heated to a molten condition and the temperature of the body of the metal under the surface is below the melting point.

Several forms of execution of the method are described and claimed herein, and still other variations will suggest themselves to those skilled in the art.

In the accompanying drawings, forming part hereof:

Fig. 1 is a perspective view illustrating one form of joint made in accordance with the invention;

Fig. 2 is an end view illustrating the heating and fusing step for this form of joint;

Fig. 3 is a section taken on the line 3—3 of Fig. 2;

Fig. 4 is an end view illustrating another mode of execution;

Fig. 5 is a sectional view taken on the line 5—5 of Fig. 6, illustrating another mode of execution; and Fig. 6 is an end view illustrating this mode of execution.

In the several views, the two pipe sections are marked 2. Different forms of the lap band are marked 3, 3ª and 3ᵇ, respectively.

The pipe sections are placed in end to end abutment as accurately as conditions will permit, though the ends need not necessarily touch, and indeed there can be some angular displacement between the sections, if the lay of the land requires it.

In Figs. 1-3, a number of plates 4 are provided to constitute the lap band, these plates having been previously curved in the direction of their length to fit the curvature of the pipe. In accordance with this form of execution, the plates 4 are disposed a distance away from the pipe, in positions to lap over both pipe sections, covering the crevice, when the plates are moved inward. While the plates are thus held in any suitable manner, the inner surfaces of the plates, and the corresponding outer surfaces of the two pipe sections adjacent the crevice, are simultaneously heated by flame jets delivered from the outer and inner sides of oxyacetylene torches 5. The intense heat thus applied for a very brief period brings the surfaces to fusion, and as soon as this is accomplished the torches are withdrawn and the plates are pressed inward against the pipe, with the result that the plates are strongly united to both pipe sections by surface fusion welds.

While substantially only the surfaces are fused, the plates may be softened sufficiently so that they will conform to any irregularities or to slight angularity in the relation of the pipe sections, when the plates are pressed home.

All of the plates may be applied at the same time, or they may be applied one at a time.

It is desirable to have the plates short enough so that there are interspaces 6 between them after they have been welded onto the pipe ends in the manner described. The portions of the crevice 7 exposed in these spaces are afterwards closed by fusing or tacking the edges together with a torch flame. It is unnecessary to secure thorough penetration in making these welds, since the main welds will be adequate to care for the principal stresses.

In the form of execution which has been described, the surface of each section of the lap band is brought to fusion substantially throughout its length and width at one time, the corresponding areas of the surfaces of the pipe sections are likewise brought to fusion at one time, and the entire weld between each plate and the pipe sections is made at one thrust.

In Figs. 4-6 the heating and welding are accomplished progressively, the pipe being preferably stationary while the torch and the means for applying the band travel around it.

In the form of execution illustrated schematically in Fig. 4, a torch 5ª and a number of rollers 8, 9 and 10 are maintained in constant spacial relationship to each other and to the pipe as they are revolved about the pipe in the direction of the main arrow. The lap band here employed is a strip, the length of which is preferably sufficient to go substantially all the way around the pipe. The torch 5ᵃ has its flame jets so disposed as to heat an area of the outer surface of each pipe section and also an area of the under surface of the strip where it approaches the pipe, to bring about the condition of surface fusion. Through the use of trailing flames 11, or suitably deflected gases of combustion from the welding flames, or by both means, the strip can be locally heated to soften it sufficiently to permit it to be readily bent under the action of the rollers 8, 9 and 10. The rollers 8 and 9 serve to guide and aline the strip, and by means of the roller 10 sufficient pressure is exerted to effect a thorough and uniform bonding of the strip to the pipe.

In Figs. 5 and 6 a hoop 3ᵇ is used as a lap or connector band, this hoop having its lateral portions 12 initially bent outward at an inclination away from the surfaces of the two pipe sections over which it is placed.

Moving torches 5ᵇ bring the surfaces 13 to fusion and soften the upturned edges 12 so that a roller 14, which proceeds in unison with the torches, can roll them down against the pipe to complete the weld.

While in the description of the second and third forms of execution it has been stated that the torches and rollers revolve about the pipe, it will be evident that the pipe could be turned relatively to these instrumentalities.

The great strength of the pipe joints obtained as herein described is due not merely to the splicing of the joints by a heavy lap band, but largely to the fact that the surface fusion welds which join the pipe ends to the band are subject to little stress other than shear stresses, which they are amply able to withstand. The rapidity with which sections of pipe can be welded together in accordance with this method is of great value in the construction of pipe lines or other conduits. The fact that the ends of the pipe do not have to be beveled is likewise a decided advantage.

Certain forms of the invention, more especially those in which a lap band is heated and rolled into surface fusion union with abutting parts to be united, are applicable for strongly joining plate metal parts whether curved or not. The abutting relation between parts to be united implies opposition of the ends or edges, rather than actual contact, since it is obvious that the confronting portions may be separated.

I claim:

1. The method of uniting pipe sections end to end, which comprises bringing simultaneously to a state of surface fusion by quick flame heating the outer surfaces of the adjoining portions of the pipe sections and the inner surface of an external lap band by flames applied directly to said surfaces while separated, and immediately bringing the heated inner surface of the lap band into contact with the heated surfaces of both pipe sections, and pressing the parts together so that they are united by surface fusion welds.

2. Form of execution of the method set forth in claim 1, wherein the fusion of the surfaces of the pipe sections and of the lap band and the pressing of the lap band against the pipe sections are effected progressively around the pipe.

3. Form of execution of the method set forth in claim 1, wherein the fusion of the surfaces of the pipe sections and of the lap band and the pressing of the lap band against the pipe sections are effected progressively around the pipe, and wherein the lap band is a strip which is progressively guided, heated to surface fusion and pressed against the circumferential surfaces of the pipe sections, which are likewise brought progressively to surface fusion.

4. The method of uniting metal parts, which comprises placing the metal parts with their edges in abutting relation, heating the side faces of the parts adjacent the abutting edges to a welding temperature by direct flame heating, simultaneously bringing a face of a lap band to a welding temperature by direct flame heating, applying the heated face of the lap band to the heated faces of the metal parts so that the lap band overlaps the ends of said metal parts and covers the seam between the abutting edges, and pressing the heated face of the lap band into intimate contact with the heated faces of the metal parts while said faces are at welding temperature.

5. The method of uniting two sections of pipe, which comprises placing the pipe sections with their ends in abutting relation, placing a lap band around the outside of the pipes in position to overlap the abutting ends of the pipe sections, and with the inside surface of the lap band contacting with the pipe sections and the edges of the lap band spaced apart from the pipe sections, simultaneously bringing the opposing spaced apart surfaces of the pipe sections and lap band to a welding temperature by direct flame heating progressively around the pipe, and progressively forcing the spaced apart surfaces of the lap joint into intimate contact with the pipe sections while the simultaneously heated surfaces are at welding temperature.

6. The method of uniting pipe sections end to end, which comprises applying the heat of high velocity, high-temperature flame jets simultaneously to the outer surfaces of the adjoining portions of the pipe sections and the inner surface of an external lap band while said surfaces are apart; and at the same time blanketing the surfaces with reducing gases, thereby fusing the outer metal so that the surfaces are covered with clean molten metal, and immediately this condition has been attained bringing the heated inner surface of the lap band into contact with the heated surfaces of both pipe sections simultaneously.

7. The method of uniting pipe sections end to end, which comprises applying the heat of high velocity, high-temperature flame jets simultaneously to the outer surfaces of the adjoining portions of the pipe sections and the inner surface of an external lap band while said surfaces are apart; and at the same time blanketing the surfaces with reducing gases, thereby fusing the outer metal so that the surfaces are covered with clean molten metal, sufficient heat being applied also to soften the metal beneath for a substantial depth, and immediately this condition has been attained bringing the heated inner surface of the lap band into contact with the heated surfaces of the pipe sections simultaneously.

GEORGE M. DEMING.